Patented Jan. 28, 1941

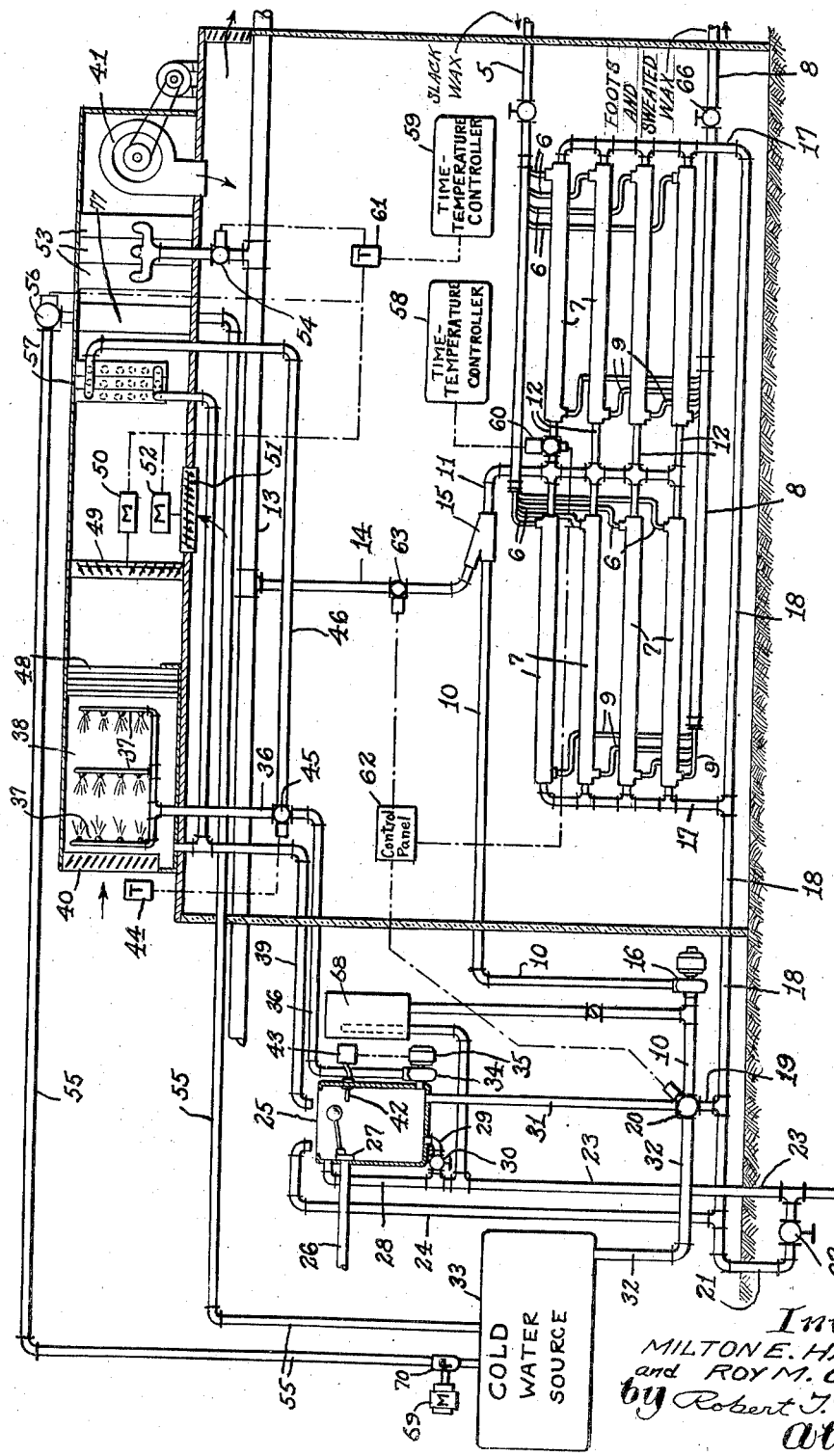

2,230,079

UNITED STATES PATENT OFFICE 2,230,079

WAX SWEATING PROCESS AND APPARATUS

Milton E. Hanson, Haddonfield, and Roy M. Owens, Woodbury, N. J., assignors to B. F. Sturtevant Company, Hyde Park, Boston, Mass., a corporation of Massachusetts Application May 25, 1939, Serial No. 275,592

9 Claims. (Cl. 196—20)

This invention relates to wax sweating and relates more particularly to methods and apparatus for speeding up the recovery of wax through sweating and for improving its quality.

In the refining of oil having a paraffin base, there remains after gasoline, kerosene and the oils have been fractioned off in a still, a mixture of paraffin waxes which it is desired to separate and to recover. Such waxes are recovered by a sweating process which consists first in cooling the mixture of waxes to solidify same, then in separate steps, heating the mixture to the melting points of the different wax components to be recovered; and running off the wax components as each is melted.

In the past, it has been customary to solidify the hot wax mixture from the stills by running it into shallow pans, having jackets or coils through which cold water was slowly circulated, and by ventilating the enclosing room. The cooling water was controlled by hand through observation of thermometers in the wax. Then it has been customary to melt the wax by hand control of heat supplied to the pans and to radiators in the room.

A feature of the present invention resides in solidifying the wax mixture by cooling the water supplied to the wax pans; by cooling air forced in contact with the pans, and by maintaining the proper relation between the air and water temperatures for ensuring the maximum rate of homogeneous solidification of the wax mixture.

Another feature of the invention resides in utilizing water from the same source for circulation through the wax pans and through the air cooler for ensuring the desired relation between the air and pan cooling water temperatures.

Another feature of the invention resides in cooling water by evaporation; in supplying the outdoor air which cools the water with the room in contact with the wax pans, and in circulating the evaporatively cooled water through the wax pans.

Another feature of the invention resides in utilizing in the heating season, water heated by the wax for heating the air stream supplied into the room.

Another feature of the invention resides in heating the solidified wax mixture by applying heat in the pans to the wax mixture; in circulating heated air in contact with the wax pans, and in maintaining a desired relation between the temperature of the air and the temperature of the wax heating medium.

Other features of the invention reside in providing automatic controls for varying the heat of the air and the heat in the pans on a predetermined schedule for melting the wax components for separation and recovery.

In one embodiment of this invention incorporating these features, outdoor air is passed through an air washer and then in a single pass through the room containing the wax pans. The water cooled by evaporation in the washer is circulated through coils in the wax pans or through jackets of the pans to cool the wax therein. During low outdoor temperatures, the air washer is disconnected and the water from the wax pans is circulated through air heating coils in the air stream thus utilizing the heat from the wax for heating the room. Thermostats regulate dampers for varying outdoor and recirculated air volumes and regulate controls for adjusting the heat and cooling applied for maintaining the desired temperatures.

After the wax has solidified, the air and the water circulated through the pans, is heated with the air temperature maintained about 6° F. higher than the temperature of the water in the pans, to successively melt the different wax components at their respective melting points.

Among the advantages of this invention are that tests have shown that the time required for the various steps as well as the total time required, is reduced substantially; the quality of the recovered wax components is greatly improved, and the usual re-sweating of some of the wax components is eliminated.

An object of the invention is to reduce the time required for wax sweating.

Another object of the invention is to improve the quality of the wax recovered in wax sweating.

Other objects of the invention will be apparent from the following description and from the drawing.

The invention will now be described with reference to the drawing which illustrates a side elevation partially in section, of one embodiment of the invention, with the controls illustrated diagrammatically.

The hot melted wax is supplied from the still (not shown) through the pipe 5 and branch pipes 6 into the pans 7. The pipe 8 and branch pipes 9 are provided for drawing off the different wax constituents following the sweating processes.

The pans 7 have water jackets or internal coils which receive cold water through the pipes 10, 11 and 12 for cooling the wax in the pans during the solidification stage, and which receive heated water through the pipes 11 and 12 caused by the addition of steam through the pipes 13 and 14 and injector 15, into the pipe 11, during the wax melting stages.

The water from the pans is returned through the action of the pump 16, through the pipes 17 and 18 to the pipe 19 connecting with the three-way valve 20, and through the pipe 21 to the valve 22 connecting with the overflow pipe 23 to the sewer, and through the pipe 24 which discharges into the upper portion of the tank 25.

The tank 25 receives make-up water through the city water supply pipe 26, controlled by the float valve 27. The pipe 28 conveys any excess water above the desired level, from the tank 25 to the drain pipe 23, and the pipe 29 and valve 30 connecting the bottom of the tank 25 with the drain pipe 23 are provided for draining the tank.

The three-way valve 20 which is thermostatically controlled as will presently be explained and is connected through the pipe 31 to the water tank 25, through the pipe 32 to the chilled water source 33, and supplies water through the pipe 10 through the action of the pump 16. The water so supplied may be drawn from the tank 25, the cold water source 33, or may be recirculated water from the pipe 19, or may be a mixture from these sources depending upon the adjustment of the valve 20. The expansion tank 68 is connected to the pipes 10 and 23 as shown.

The pump 34 driven by the electric motor 35, draws water from the tank 25 and supplies it through the pipe 36 to the spray headers 37 in the air washer 38. Water from the washer returns through the pipe 39 to the tank 25.

The air washer 38 serves as a cooling tower for cooling by evaporation, the water circulated through it from the tank 25. Outdoor air is drawn into it through the inlet 40, by the centrifugal fan 41. The thermostat 42 exposed to the water in the tank 25 actuates the control 43 to stop the water pump 35 when the tank water is at a desired temperature, and to start the water pump when the tank water is too warm.

The outdoor thermostat 44 controls the two-way valve 45 in the water pipe 36 to shut off the supply of water to the air washer 38, and instead to route the water through the pipe 46 and through the heat exchanger 57 in the air stream, when the outdoor temperature approaches the freezing point.

The usual eliminators 48 are placed at the outlet of the washer 38. The outdoor air dampers 49, the position of which is adjusted by the motor 50, and the recirculated air dampers 51, the position of which is adjusted by the motor 52, are arranged between the eliminators 48 and the heat exchanger 57.

The air heater 53 is arranged adjacent the heat exchanger 57, and is supplied during the heating stage with steam from the pipe 13, through the thermostatically controlled valve 54.

The cold water source 33 is connected by the pipe 55 and thermostatically controlled valve 56 to the air cooling coil 77, the latter being arranged adjacent the heat exchanger 53 in the path of the recirculated air through the dampers 51 for cooling the air as will be explained. The motor 69 drives the pump 70 in the piping 55 for supplying the water from the source 33 to the cooler 77.

In operation, the hot wax mixture enters the pans 7 at about 130° F. It is desired to cool it at a uniform rate down to about 75° F. as soon as it is possible to do so while ensuring that all portions cool uniformly and evenly so that the elementary particles of the constituents having the higher melting points solidify to permeate the entire mass homogeneously. This is accomplished in the present invention by correct cooling of the wax through air cooling and through water cooling at the pans. This cooling is effected slowly and evenly and at a predetermined rate by cooling the upper surface with air, and the side and lower pan contacting surfaces by cooling water so that wax loses heat at the same rate at all surfaces.

The time temperature controllers 58 and 59 are standard Taylor controllers, of the type well known to those skilled in the art and which include clock and cam mechanism for advancing or retarding controls at a predetermined rate.

The controller 58 resets the thermostat 60 in the water line 12 for controlling the temperature at the wax pans during both the cooling and heating cycles.

The controller 59 resets the thermostat which controls the temperature of the air supplied to the wax sweating room, during both the cooling and heating cycles.

The two controllers 58 and 59 are coordinated to maintain the desired relation between the temperature of the air and the temperature of the water at the wax pans. For example, in the cooling step which will now be described, the controllers act to maintain the air and water at the pans at the same temperature.

At the beginning of the cooling step, the controllers 58 and 59 are adjusted to place the cooling cams in operation and to disconnect the heating cams. The control panel 62 is adjusted to disconnect the water heating control valve 63 from the thermostat 60, and to connect the three-way valve 20 to the thermostat 60.

The pump 16 is operated to circulate water through the pans 7, the thermostat 60 being first adjusted by the controller 58 to call for a relatively high water temperature so that the thermostat 60 adjusts the valve 20 to close off the pipes 31 and 32 so that the water is continuously recirculated through the wax pans, becoming heated to a temperature slightly below the wax temperature during the process.

At the same time, the controller 59 adjusts the room thermostat 61 to a temperature which experience has shown the recirculated water becomes heated to during recirculation, so that the thermostat 61 adjusts the damper motors 50 and 52, which adjust the fresh air dampers 49 towards closed position, and the recirculated air dampers 51 towards open position, and adjusts the steam valve 54 to supply steam to the coils 53 for heating the air.

After a predetermined period of time, which, for example, may be twenty minutes, the controllers 58 and 59 adjust the thermostats 60 and 61 respectively, to lower the temperature a predetermined amount, which for example may be 3° F. The thermostat 60 then adjusts the valve 20 to draw the correct volume of water from the tank 25 through the pipe 31 for lowering the water temperature the desired 3°. At the same time, the thermostat 61 adjusts the damper motors 50 and 52 to admit more outdoor and less recirculated air and to admit less steam into the heaters 53 so as to lower the air temperature the desired 3°.

The above described temperature lowering processes may be repeated every twenty minutes. After a period of time, the fresh air dampers will be fully opened, the recirculated air dampers fully closed, the steam valve 54 fully closed, and the valve 20 adjusted so as to close the recirculated water pipe 19 and to fully open the pipe 31 connecting with the tank 25.

The water in the tank 25 is kept at a predetermined temperature by the thermostat 42 which starts and stops the pump 34 as the tank water temperature rises above or arrives at, respectively, the temperature at which the thermostat 42 acts.

Ordinarily at most locations, the wet bulb temperature of the outdoor air is low enough to maintain the minimum water temperature of 75° F. If the wet bulb temperature rises above 75° F., to say 80° F., no harm is done as all outdoor air will be supplied to the room and water cooled by the evaporative action of the air is supplied to the wax pans, both obviously being at the same temperature. In such a case, the solidification would just take longer.

Some locations are expected to have high wet bulb temperatures and other more favorable locations to have occasional high wet bulb temperatures which would prevent the water in the tank 25 from being properly cooled. Accordingly the cold water source 33 is provided for providing the proper cooling temperature when evaporative cooling is not sufficient. The source 33 may be a refrigerated source, ice or mechanical, or may be well water if low temperature well water is available.

If the water from the tank 25 does not have a sufficiently low temperature, the thermostat 60 adjusts the valve 20 to admit water from the source 33. Since if the tank water is not low enough for maintaining the scheduled temperature, neither will the air temperature be low enough, the thermostat 61 adjusts the valve 56 to admit water from the source 33 to the air cooling coils 77.

At the end of about six and one-half hours, as experience has shown, following the above-described process, the wax is solidified more homogeneously and in a much shorter period of time than has been achieved by prior processes.

In the next step which is for melting the wax mixture, the control panel 62 is adjusted to disconnect the valve 20 from the thermostat 60 and to connect the steam valve 63 to the thermostat 60. At the same time, the cooling cams on the controllers 58 and 59 are disconnected and the heating cams are connected. During the heating steps it is preferred that the air temperature be maintained about 6° F. higher than the water temperature at the pans.

During the first heating step, of which there are several, the water and air temperatures are raised at the rate of about 2° F. per hour for about ten hours. At the end of this time, the wax will be heated to about 95° F. which is the melting point of the lowest melting wax constituent.

During this heating step, the thermostat 60 is adjusted by the controller 58 on schedule to adjust the valve 63 to admit steam from the main 13 with the water heating injector 15. At this time, the valve 20 is adjusted through being disconnected from the control panel 62 to close pipes 31 and 32 so that the pump 16 recirculates the heating water.

At the same time, the controller 59 adjusts the thermostat 61 on schedule, and this thermostat adjusts the dampers 49 and 51 and the steam valve 54 to main the air temperature in step with the water temperature.

The melted wax is then run off by manual adjustment of the valve 66 and following this, the wax is heated to the melting temperature of the next highest melting constituent which may be 110° F. The temperatures are again advanced as above described at the rate of 2° F. per hour until 110° F. is reached when the melted, second wax constituent is run off.

The remaining wax constituent is then melted by running up the temperature of the air and of the water, to about 200° F., as rapidly as the limitations of the equipment permit.

The thermostatically controlled valves and dampers and the thermostats and their controls are well known to those skilled in the art and form no part of the present invention, and their details have not been illustrated and described. These controls may be operated by compressed air, hydraulically or electrically, controls of all these types now being available.

While an embodiment of the invention has been described for the purpose of illustration, it should be understood that the invention is not limited to the exact apparatus and arrangement of apparatus described, for many departures may suggest themselves to those skilled in the art without departure from the essence of this invention.

We claim:

1. The method in wax sweating which comprises circulating a cooling fluid in indirect contact with a melted wax mixture, circulating air in contact with the wax surface, progressively reducing the temperature of the fluid to solidify the wax mixture, and conformably reducing the temperature of the air.

2. The method in wax sweating which comprises circulating a cooling fluid in indirect contact with a melted wax mixture, circulating air in contact with the wax surface, progressively reducing the temperature of the fluid and of the air to solidify the wax mixture, and maintaining a substantially fixed relation between the temperature of the air and of the fluid.

3. The method in wax sweating which comprises passing outdoor air through water to cool the air and the water by evaporation, circulating the cooled air in contact with the surface of a melted wax mixture, and circulating the cooled water in indirect contact with the wax mixture.

4. In a wax sweating plant having wax receiving pans, said pans including water receiving, wax cooling surfaces, an air washer, means for circulating water through said surfaces and through said washer, and means for passing outdoor air through said washer and in contact with the surface of the wax in said pans.

5. In a wax sweating plant having wax sweating pans, said pans including water receiving, wax cooling surfaces, means for circulating water through said surfaces, means for cooling the water supplied to said surfaces, means including a thermostat responsive to the temperature of the water at said surfaces for controlling said cooling means, blower means for circulating air through said plant in contact with said pans, means placed substantially above said pans for cooling said air, means including a thermostat responsive to the air in said plant for controlling said air cooling means, and time controlled means for progressively and conformably resetting said thermostats to function at a plurality of successively lower temperatures.

6. The method in wax sweating which comprises circulating a cooling fluid in indirect contact with a melted wax mixture, circulating air in contact with the wax surface, progressively reducing the temperature of the fluid to solidify the wax mixture, and conformably reducing the temperature of the air first by adding decreasing quantities of heat to the air and next by extracting increasing quantities of heat from the air.

7. The method in wax sweating which comprises circulating a cooling fluid in indirect contact with a melted wax mixture, circulating air in contact with the wax surface, progressively reducing the temperature of the fluid to solidify the wax mixture, conformably reducing the temperature of the air first by adding decreasing quantities of heat to the air and next by extracting increasing quantities of heat from the air, and maintaining a substantially fixed relation between the temperature of the air and of the fluid.

8. In a wax sweating plant having wax receiving pans including water receiving, wax cooling surfaces, a source of relatively cold water, means for circulating air in contact with said pans, an air heater, an air cooler, means including a thermostat responsive to the temperature of said surfaces, a pump and piping for gradually lowering the temperature of said surfaces, first by recirculating the water in said piping and surfaces and then by admitting gradually increasing amounts of water from said source into said piping, means including a second thermostat responsive to the temperature of the air in said plant for gradually lowering conformably and concurrently the temperature of the air first by gradually decreasing the effectiveness of said heater and next by gradually increasing the effectiveness of said cooler, and time controlled means for resetting said thermostats at progressively lower temperatures.

9. In a wax sweating plant having wax receiving pans, said pans including water receiving, wax cooling surfaces, means including piping for recirculating water through said surfaces, a source of unheated water, means for circulating air in contact with said pans, air heating means, a cold water source, air cooling means, a first thermostat responsive to the temperature of the water in said surfaces, a second thermostat responsive to the air in said plant, means including said first thermostat for supplying water from said unheated water source into said piping and for supplying water from said cold water source into said piping, means including said second thermostat for adjusting said heater and for supplying water from said cold water source to said cooler, and means including time controlled means for adjusting said first thermostat to function at successively lower temperatures, first to supply increasing volumes of water from said unheated water source into said piping, then to shut off said source of unheated water and then to supply increasing volumes of water from said cold water source into said piping, and for adjusting said second thermostat to function at successively lower temperatures, first to adjust said heater to add decreasing quantities of heat to the air, then to shut off said heater and then to add increasing volumes of water from said cold water source into said cooler.

MILTON E. HANSON.
ROY M. OWENS.